April 25, 1950     H. W. DARR     2,505,233
TIRE SUPPORT AND INSPECTION LIGHT
Filed April 22, 1946
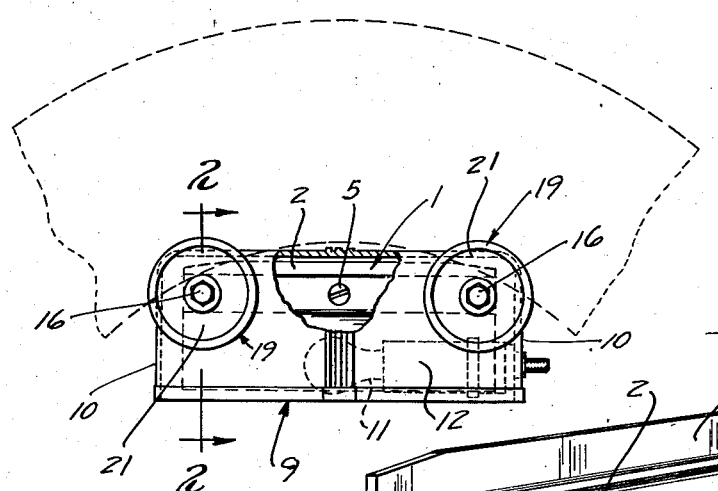
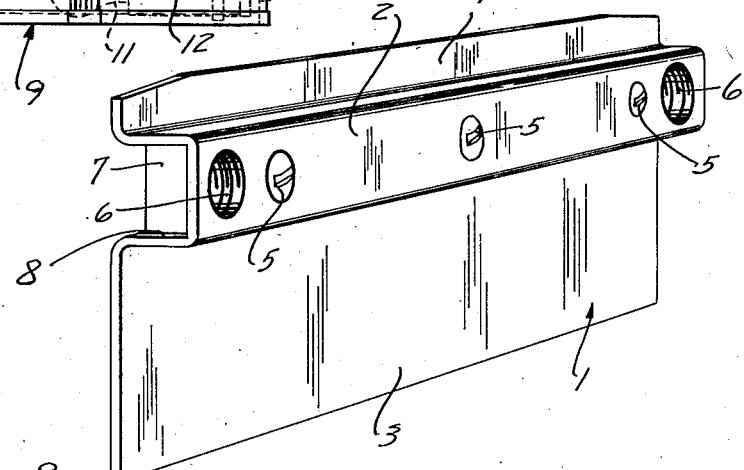
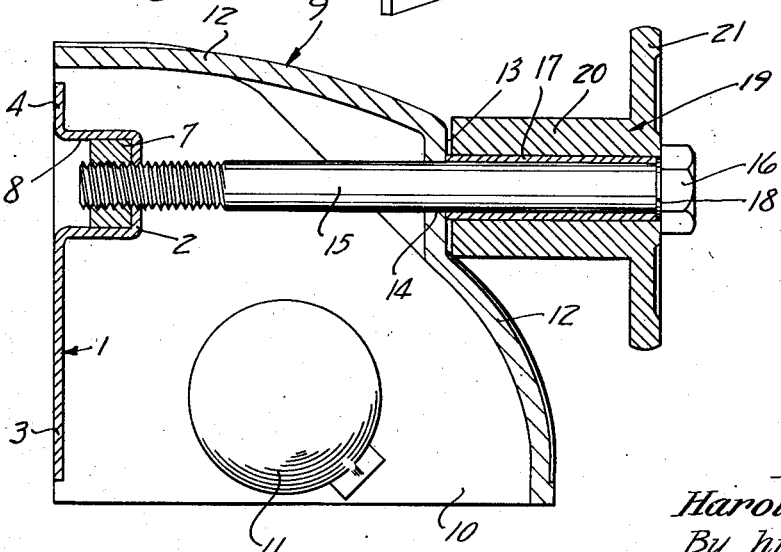
Inventor
Harold W. Darr
By his Attorneys
Merchant & Merchant Patented Apr. 25, 1950

2,505,233

UNITED STATES PATENT OFFICE 2,505,233

TIRE SUPPORT AND INSPECTION LIGHT

Harold W. Darr, Minneapolis, Minn., assignor to Char-Lynn Co., Minneapolis, Minn., a corporation of Minnesota Application April 22, 1946, Serial No. 664,099

1 Claim. (Cl. 88—14)

My invention relates to tire inspecting devices and more particularly to lamp hoods or shades upon which a pneumatic tire may be mounted for rotation to facilitate inspection of the inside thereof, within the light projected from the shade.

The primary object of my invention is the provision of a novel arrangement of parts to facilitate the attachment of such a device to the wall or the like.

A still further object of my invention is the provision of such a device in which the minimum of parts is utilized, which can be quickly manufactured and which is extremely durable in use.

The above and still further objects of my invention will become apparent from the following detailed specification, appended claim and attached drawings.

Referring to the drawings in which like characters indicate like parts throughout the several views:

Fig. 1 is a front elevation, with some parts broken away and shown in section, of my device supporting a tire shown by dotted lines;

Fig. 2 is a view in cross section taken on the vertical line 2—2 of Fig. 1; and

Fig. 3 is a front perspective of the anchoring plate.

Referring with greater particularity to the drawings, the numeral 1 indicates a generally rectangular anchoring plate made of sheet steel or other suitable materials and having a horizontally-extending outwardly-projecting rib 2, shown as being in the form of an inverted U formed adjacent its upper edge, whereby to provide a downwardly-extending apron 3 and a narrower upwardly-extending flange 4. Preferably and as shown, anchoring plate 1 is secured to a wall or the like by means of screws 5 which extend inwardly through the rib 2 to a wall or other suitable supporting structure, not shown. Adjacent its outer edge rib 2 is provided with a pair of threaded openings 6. Preferably, and as shown, a pair of burrs 7 are secured by welding or the like within the channels 8 of the rib 2. The screw-threaded openings in the burrs 7 are, of course, in alignment with the openings 6 of the ribs.

A lamp shade in the form of a hood and identified by the numeral 9 is open at the back and bottom and provided with end portions 10 (to one of which a lamp 11 or other suitable source of light is secured), and a downwardly and outwardly extending wall 12.

Midway of its length, wall 12 is provided with vertical wall portions 13. Wall portions 13 have a pair of horizontal openings therethrough which are spaced apart a distance equal to the spacing of the openings 6 in the rib 2. As shown, particularly with reference to Figs. 1 and 2, anchoring plate 1 and rib 2 are adapted to be received within the open back portion of shade 9. A pair of anchoring bolts 15, having heads 16, are adapted to extend loosely through the spaced openings 14 in the vertical portions 13 of wall 12 and have screw-threaded engagement with the burrs 7 in rib 2. As shown in Fig. 2, anchoring bolts 15 are provided with elongated sleeves 17 adjacent their outer ends. Interposed between sleeves 17 and heads 16 of anchoring bolts 15 are washers 18 of the same diameter as the sleeves 17. As shown, the inner ends of sleeves 17 abut against the vertical wall portions 13.

Mounted for rotation on the outer ends of anchoring bolts 15 and riding upon the sleeves 17 are a pair of rollers 19 which can be made of plastic or any suitable material. Rollers 19 include elongated tire bead-supporting portions 20 and radially-projecting circumferentially-extending flanges 21 adjacent their outer ends. Again referring to Fig. 2, it will be seen that the rollers 19 are of slightly less length than the length of sleeves 17, the purpose of which is obviously to assure freedom of rotation of the rollers 19 irrespective of the extent of tightening of anchoring bolts 15 in threaded openings 6.

By this novel arrangement it should be obvious that the anchoring plate 1 can be secured to a wall or the like by means of screws 5 without interference from or obstruction by the hood portion 9 and parts carried thereby. Thereafter the hood portion may be quickly set into place and the anchoring bolts 15 fitted into holes 6, and the entire device securely locked in place.

While I have disclosed the preferred embodiment of my invention as required by Sec. 4888 of the U. S. statutes, it should be obvious that the same is subject to modification without departing from the scope of the appended claim.

What I claim is:

In a tire inspection device of the class described, an anchoring plate adapted to be secured to a wall, an elongated rib adjacent the upper edge of said anchoring plate, a pair of spaced screw-threaded openings in the rib, a hood-like lamp shade open at its bottom and back portions, the lamp shade being adapted to direct light downwardly through said open bottom portion, said lamp shade receiving said anchoring plate within its open back portion, spaced openings in said hood alignable with the openings in said rib, a pair of horizontally disposed anchoring bolts extending through the openings in said lamp shade and making screw-threaded engagement with the openings in said rib, and a pair of tire-supporting rollers mounted for rotation on the free ends of said anchoring bolts outwardly of said lamp shade.

HAROLD W. DARR.

REFERENCES CITED

The following references are of record in the file of this patent:

UNITED STATES PATENTS

| Number | Name | Date |
|---|---|---|
| 1,376,579 | Ramsdell | May 3, 1921 |
| 1,517,278 | Case | Dec. 2, 1924 |
| 1,876,625 | Daugherty | Sept. 13, 1932 |
| 1,878,515 | Hazard | Sept. 20, 1932 |
| 1,954,300 | Sorum | Apr. 10, 1934 |
| 2,189,203 | Glynn | Feb. 6, 1940 |